T. H. Neal. Sheet 1, 2 Sheets.
Dummy Engine.
Nº 39,060. Patented Jun. 30, 1863.
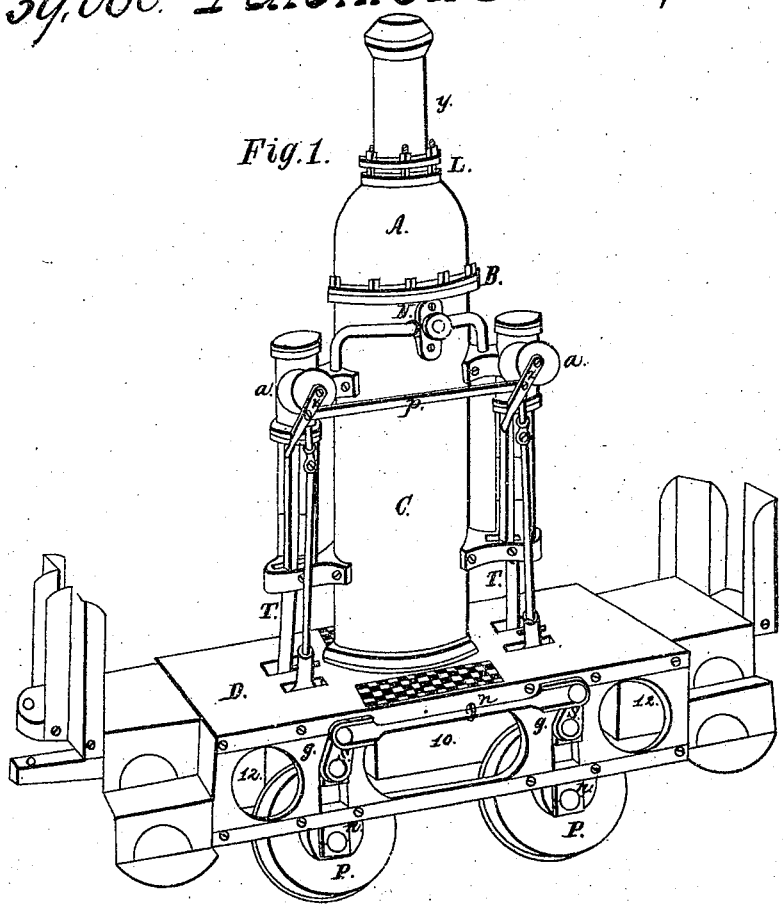
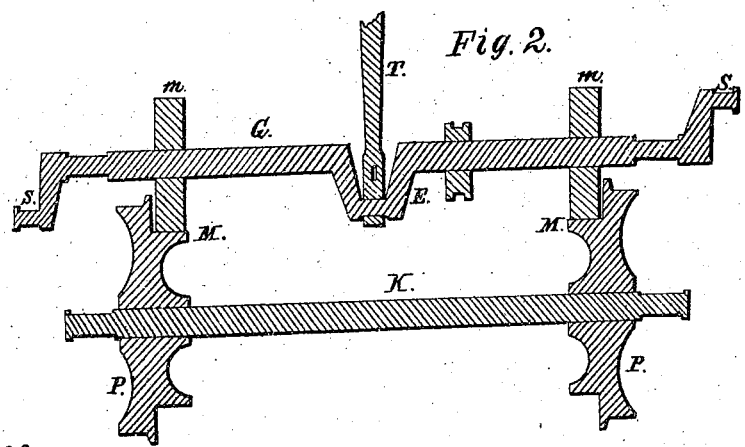
Witnesses.
J. W. Ells
A. S. Nicholson
Inventor.
Thomas H. Neal

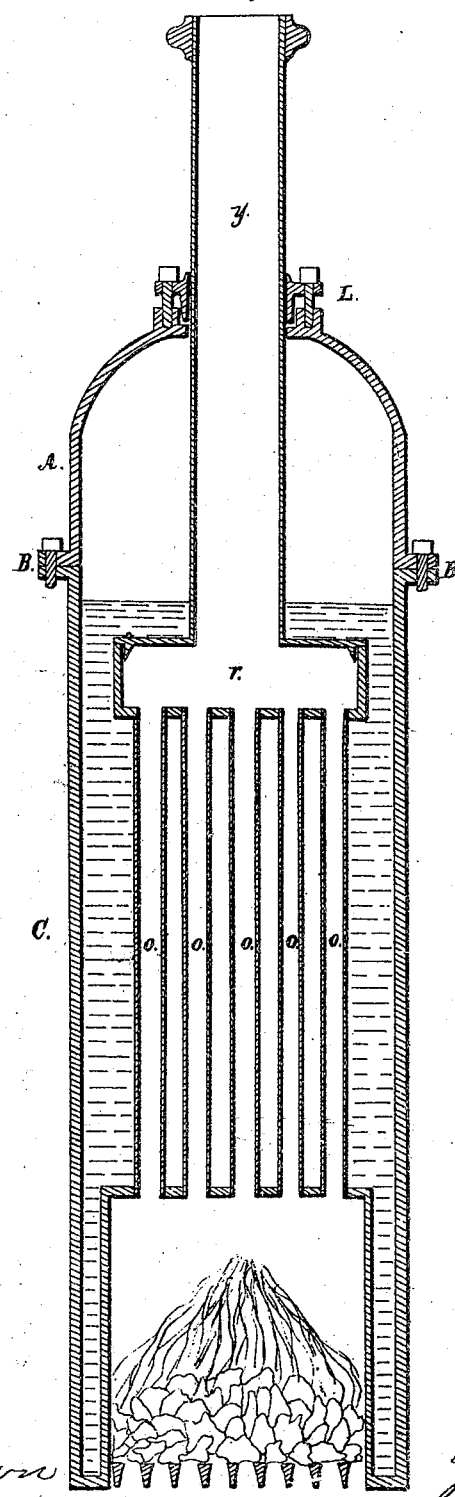

UNITED STATES PATENT OFFICE.

THOMAS H. NEAL, OF PITTSBURG, PENNSYLVANIA.

IMPROVEMENT IN RUNNING-GEAR OF LOCOMOTIVES.

Specification forming part of Letters Patent No. 39,060, dated June 30, 1863.

*To all whom it may concern:*

Be it known that I, THOS. H. NEAL, of the city of Pittsburg, in the county of Allegheny and State of Pennsylvania, have invented a new and useful Improvement in Locomotives for Drawing Street-Cars; and I do hereby declare that the following is a full, clear, and exact description thereof, reference being had to the accompanying drawings, which form part of this specification, and to the letters of reference marked thereon, in which—

Figure 1 represents a perspective view of a locomotive with my improvements. Fig. 2 is a longitudinal vertical section of the wheels, axle, crank-shaft, and friction-rollers, showing the relative position of the parts. Fig. 3 is a sectional view of the boiler.

The nature of my invention consists in transmitting motion from the crank-shafts to the wheels bearing on the rails by means of friction-rollers, and also in securing the bearings of the crank-shaft in the same pedestals wherein the bearings of the axles rest, and so arranging the crank-shaft with relation to the wheels bearing on the rails, as that said wheels and crank-shafts shall take the entire weight of the locomotive, without throwing any weight upon the axles, and for obtaining room on the platform of the locomotive.

In locomotives, whether of this class or any other in present use, both the engines are connected to the same crank-shaft, and motion transmitted therefrom to the axles by gearing with cog-wheels, belts, or similar devices. This detracts considerably from the power of the engines, while a very disagreeable and unavoidable noise is produced, which is the great objectionable feature in the use of locomotives for drawing passenger-cars in the streets of a crowded city.

In my improved locomotive a crank-shaft, G, Fig. 2, is placed over each axle K supporting the wheels P and parallel thereto, having their bearings in the same pedestals, $g$, in the middle of these shafts, and working over the axles are cranks E, Fig. 2, to which the engines are attached by connecting-rods $n$, Fig. 1, passing up through the platform D, Fig. 1, of the locomotive. Near each end of these shafts, just inside of their bearings or boxes in which they turn are large rollers $m$, resting upon still larger rollers, M, Fig. 2, cast upon the wheels P, which take all the weight of the locomotive, the axles K, Fig. 2, being relieved of all strain, and are only required to keep the wheels in place. On motion being imparted to the crank-shafts K, Fig. 2, by the engines, the rollers $m$, Fig. 2, on the shafts communicate the same to the wheels P by friction on their rollers M, Fig. 2. On the ends of these shafts and outside of their bearings in the pedestals $g$ are cranks $s$, which connect the shafts together by rods $n$, Fig. 1, for the purpose of keeping the engines at right angles, whereby they assist one another and can be started and stopped in any position, however sudden, by simply reversing the direction of the steam, which is effected through the medium of the turret-valves which "swaps the ports" in the steam-chest $a$, Fig. 1, of the engines, their position being changed by the small hand-levers $x\ x$, Fig. ?, which are connected by a long link, $p$, Fig. 1, so that both are moved by a pull on either. This arrangement is nothing more than the ordinary slide-valve "nigger-engine," (the construction of which is well understood.) This plan of connecting the valves enables the engineer to start, stop, or reverse the motion of the locomotive without regard to the throttle-valve N, Fig. 1, which is only intended to be opened or closed at the stations. The boiler C, for supplying steam, rests in the center of the platform D, Fig. 1, between the axles, and of that class known as "upright tubular boilers," and is the same with this exception, that the tubes $o\ o\ o\ o$, Fig. 3, instead of extending to the top of the boiler C, terminate in a smoke-box, $r$, Fig. 3, below the water-line, the upper ends of the tubes, together with the smoke-box, being submerged with water and completely covered and protected thereby. Surmounting the boiler C and above the smoke-box $r$ is a steam dome, A, which is secured to the boiler by screw-bolts passing through the flanges B B, Fig. 3. The chimney $y$ extends from the smoke-box up through the top of the dome A, the joint between the two being kept tight by a stuffing-box, L, with its appropriate packing. This admits of the expansion and contraction the tubes undergo to take place without affecting the joints in the tube-sheet. The fire-door of the boiler, with the coal-bunkers 10, Fig. 1, and water-tanks 12 12, Fig. 1, being below the platform D, Fig. 1, of the locomotive, gives ample room to the engineer, and enables him to work around the engines with the greatest facility.

Having thus described my improvement in locomotives used for drawing street-cars, I claim—

1. Transmitting motion from the crank-shaft to the wheels bearing on the rails by means of the friction-rollers, operating in the manner and by the means described, and for the purpose set forth.

2. Securing the bearings of the crank-shafts in the same pedestals wherein the bearings of the axles rest, and so arranging the crank-shafts with relation to the wheels bearing on the rails as that said wheels and crank-shafts shall take the entire weight of the locomotive, as herein described, and for the purpose set forth.

THOMAS H. NEAL.

Witnesses:
J. W. ELLS,
A. S. NICHOLSON.